(12) United States Patent
Gerard

(10) Patent No.: US 8,522,020 B2
(45) Date of Patent: Aug. 27, 2013

(54) SYSTEM AND METHOD FOR VALIDATING A LOCATION OF AN UNTRUSTED DEVICE

(75) Inventor: Mark Gerard, Plano, TX (US)

(73) Assignee: Osocad Remote Limited Liability Company, Wilmington, DE (US)

( * ) Notice: Subject to any disclaimer, the term of this patent is extended or adjusted under 35 U.S.C. 154(b) by 780 days.

(21) Appl. No.: 12/629,948

(22) Filed: Dec. 3, 2009

(65) Prior Publication Data
US 2011/0138443 A1 Jun. 9, 2011

(51) Int. Cl.
*H04L 29/06* (2006.01)

(52) U.S. Cl.
USPC .......................................................... 713/168

(58) Field of Classification Search
None
See application file for complete search history.

(56) References Cited

U.S. PATENT DOCUMENTS

| | | | |
|---|---|---|---|
| 6,078,826 A | 6/2000 | Croft et al. | |
| 7,020,476 B2 * | 3/2006 | Day et al. | 455/456.5 |
| 7,072,672 B1 | 7/2006 | Vanska et al. | |
| 7,221,750 B2 * | 5/2007 | Brahmbhatt et al. | 379/201.06 |
| 7,295,831 B2 * | 11/2007 | Coleman et al. | 455/410 |
| 7,346,338 B1 * | 3/2008 | Calhoun et al. | 455/411 |
| 7,448,073 B2 * | 11/2008 | Rosenberger | 726/4 |
| 8,104,073 B2 * | 1/2012 | Hanna | 726/4 |
| 8,225,379 B2 * | 7/2012 | van De Groenendaal | 726/5 |
| 8,256,003 B2 * | 8/2012 | Dadhia et al. | 726/25 |
| 2003/0064731 A1 | 4/2003 | Angelo | |
| 2004/0121787 A1 * | 6/2004 | Day et al. | 455/502 |
| 2005/0037733 A1 * | 2/2005 | Coleman et al. | 455/411 |
| 2005/0172153 A1 * | 8/2005 | Groenendaal | 713/201 |
| 2006/0116170 A1 * | 6/2006 | Brahmbhatt et al. | 455/560 |
| 2006/0165030 A1 | 7/2006 | Fox | |
| 2006/0200862 A1 * | 9/2006 | Olson et al. | 726/23 |
| 2007/0079113 A1 * | 4/2007 | Kulkarni et al. | 713/150 |
| 2007/0171859 A1 * | 7/2007 | Brahmbhatt et al. | 370/328 |
| 2007/0291945 A1 * | 12/2007 | Chuang et al. | 380/270 |
| 2007/0294747 A1 * | 12/2007 | Rosenberger | 726/4 |
| 2008/0268816 A1 | 10/2008 | Wormald | |
| 2008/0282347 A1 * | 11/2008 | Dadhia et al. | 726/22 |
| 2009/0041252 A1 * | 2/2009 | Hanna | 380/278 |
| 2009/0061890 A1 | 3/2009 | Andreasson | |
| 2009/0172821 A1 * | 7/2009 | Daira et al. | 726/27 |
| 2009/0215402 A1 | 8/2009 | Ng | |
| 2010/0024009 A1 * | 1/2010 | Comay et al. | 726/4 |
| 2011/0116442 A1 * | 5/2011 | Caldwell et al. | 370/328 |
| 2011/0136510 A1 | 6/2011 | Petersen | |

FOREIGN PATENT DOCUMENTS

| | | |
|---|---|---|
| EP | 1596300 | 11/2005 |
| EP | 1919146 | 5/2008 |
| WO | 02086714 | 10/2002 |
| WO | 2006130845 | 12/2006 |
| WO | 2011068626 | 6/2011 |

OTHER PUBLICATIONS

Stolowitz Ford Cowger LLP; Related Case Listing; Jun. 22, 2011, 1 Page.

(Continued)

*Primary Examiner* — Oscar Louie
(74) *Attorney, Agent, or Firm* — Stolowitz Ford Cowger LLP

(57) ABSTRACT

In a system of mobile agents operating in a region of interest, it may be necessary to validate the position of an untrusted device prior to allowing the untrusted device to perform agent functions within the region of interest. Trusted mobile agents within the region of interest may activate wireless access points with randomly generated identifiers. The untrusted device may be instructed to provide a list of identifiers of visible wireless access points to confirm that the untrusted device is within the ROI.

30 Claims, 5 Drawing Sheets

(56) References Cited

OTHER PUBLICATIONS

Satoh I; "Linking Physical Worlds to Logical Worlds with Mobile Agents"; Mobile Data Management, Proceedings, 2004 IEEE International Conference, Berkeley, CA, US; Jan. 19, 2004; pp. 332-343.

European Patent Office, International Searching Authority; PCT/US2010/055651; International Search Report and Written Opinion; Feb. 16, 2011; 13 Pages.

European Patent Office; IB Written Opinion of the ISA, PCT/US2010/055651; Jun. 14, 2012; 8 Pages.

* cited by examiner

SYSTEM AND METHOD FOR VALIDATING A LOCATION OF AN UNTRUSTED DEVICE

FIELD OF THE INVENTION

This disclosure relates to location aware mobile devices and in particular to validating the location of a location aware mobile device.

BACKGROUND OF THE INVENTION

GPS provides a solution that allows a GPS-enabled device to calculate its location based on location measurements from various satellites' perspective. Once computed, this location can be shared with other agent-based applications to determine if the device is eligible to participate inside a Region of Interest (ROI), for example as described in the Applicant's co-pending patent application Ser. No. 12/629,926, filed Dec. 3, 2009, titled System and Method for Migrating Agents Between Mobile Devices, the entire contents of which are incorporated herein by reference.

Using GPS exclusively to determine the location of a device has some problems. The location calculation can be spoofed by the device or incorrectly calibrated because of GPS signal interference leading to location misrepresentations (intentional or unintentional). In some circumstances, there can be a security risk presented by granting ROI participation rights for agents outside of the ROI.

One alternative to using GPS is to use WiFi to track the location of a device. In this case, the device being tracked is pre-configured with knowledge of all wifi access points and the fixed position of each wifi access point. The device being tracked reports the signal strength of all visible access points to another server in order for the server to compute its location. The preconfiguration requirement of the device can be cumbersome and can lack flexibility.

What is required is a system and method for validating a location of a device.

SUMMARY OF THE INVENTION

In one aspect of the disclosure, there is provided a method for verifying a position of an untrusted device in a region of interest comprising at least one wireless access point and at least one trusted agent assigned to each wireless access point. The method comprises identifying a validation requirement for the untrusted device, instructing the untrusted device to identify one or more wireless access points in the region of interest, receiving one or more wireless access point identifiers from the untrusted device, and validating the one or more wireless access point identifiers to verify the position of the untrusted device.

In one aspect of the disclosure, there is provided a system comprising at least one wireless access point configured to communicate a wireless access point identifier, a first agent application configured to execute on a first mobile device, and an agent bootstrap. The agent bootstrap may be configured to execute on an untrusted mobile device, identify a wireless access point identifier of the at least one wireless access point, and provide one or more wireless access point identifiers to the first agent application. The first agent application may be configured to receive the one or more wireless access point identifiers from the agent bootstrap and validate the untrusted device if the one or more wireless access point identifiers correspond with the at least one wireless access point.

In one aspect of the disclosure, there is provided a computer-readable medium comprising computer-executable instructions for execution by a first processor of a first device, that, when executed, cause the first processor to determine a location of the first device, provide the location of the first device to a second processor of a second device, communicate with one or more wireless access points, determine an identifier of each of the one or more wireless access points, and communicate the identifier of each of the one or more wireless access points to the second processor.

BRIEF DESCRIPTION OF THE DRAWINGS

Reference will now be made, by way of example only, to specific embodiments and to the accompanying drawings in which.

DETAILED DESCRIPTION OF THE INVENTION

Figure 1:
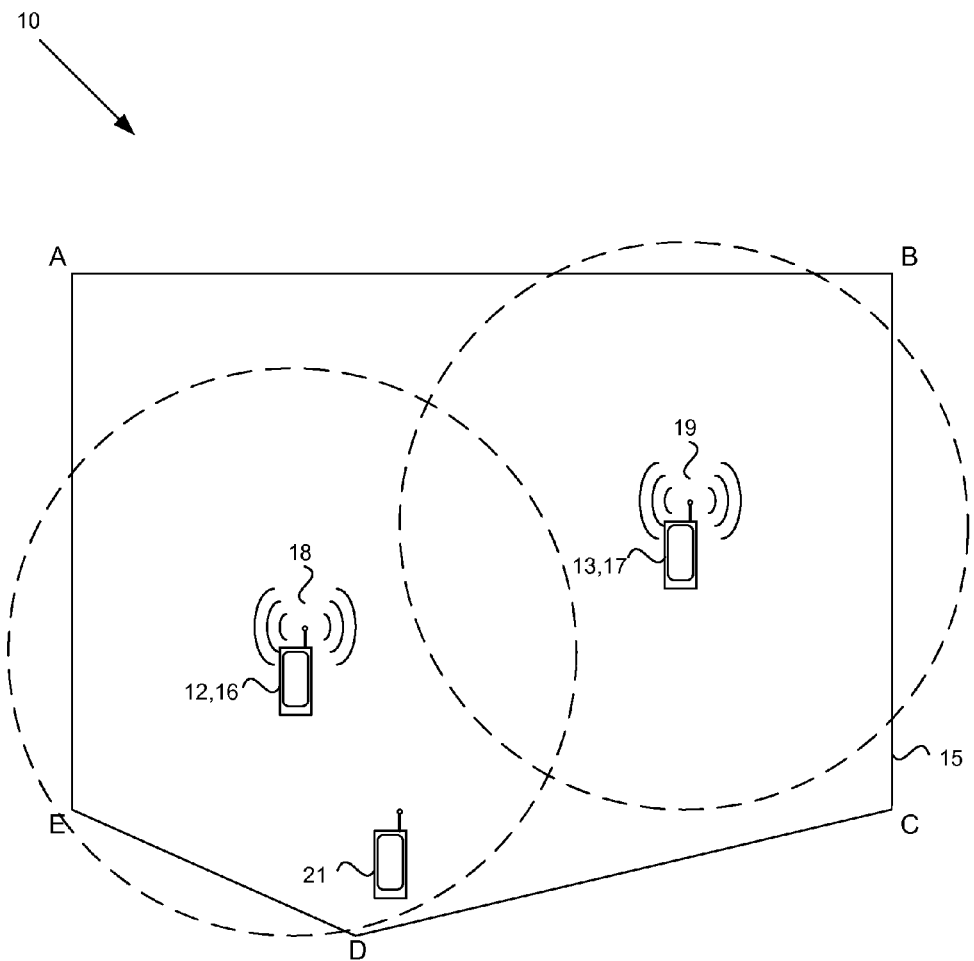
FIG. 1 illustrates a system operating in a region of interest.

In FIG. 1 there is shown a system 10 including a network of agents 12, 13 operating in a defined region of interest (ROI) 15. Typically, the region of interest may be defined by a series of latitude/longitude points or some similar array of coordinates, though other methods for defining the ROI 15 will be apparent to a person skilled in the art. In the example shown, agents 12 and 13 are both trusted agents that participate within the ROI 15 and are hosted on devices 16, 17 respectively. The agents 12, 13 may be configured to perform particular tasks and functions on their respective devices 16, 17 and in regard to the ROI 15. Examples of ROI specific tasks are included in the Applicant's co-pending patent application Ser. No. 12/629,926, filed Dec. 3, 2009, titled System and Method for Migrating Agents Between Mobile Devices, reference above.

The devices 16, 17 each provide wireless access points 18, 19 and include GPS units or similar location providers such that the agents 12, 13 are location aware and in particular are aware of their presence within the ROI. Typically, the devices 16,17 will be mobile devices, such as cellular phones, personal digital assistants (PDA), netbooks, or laptops though in some cases, one or more of the devices 16,17 may be static devices.

Other agents on trusted devices not associated with a wireless access point may be provided into the ROI 15 for performing particular tasks and functions in respect of the ROI 15.

Other devices may enter and exit the ROI 15 and may wish to participate in agent activities of the ROI 15. In particular, a device 21 may include agent bootstrap code that allows the device 21 to receive mobile agents into the device 21 to perform dedicated tasks and functions. In the present embodiments it is considered a requirement that the agents execute only within the ROI 15 and there it may be necessary to validate that the untrusted device is properly within the ROI before any transfer of agent resources to the device 21 can occur.

The untrusted device 21 may seek to participate in agent activities by providing an agent participation request to available agents that requests agent resources be sent to the device. The agent participation request will typically include a location of the device 21 that allows the trusted agents to confirm that the device 21 is properly within the ROI before sharing agent resources with the device 21. Thus agent participation requests received by trusted agents within the ROI 15 that indicate that the device 21 is outside of the ROI will be ignored.

Figure 2:
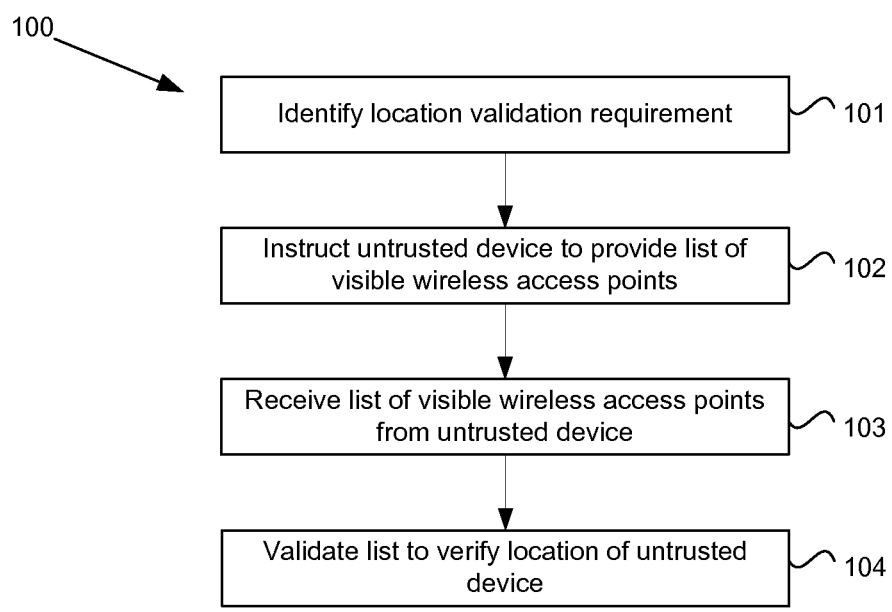
FIG. 2 illustrates a method for validating a location of an untrusted device.

However, even where the device 21 indicates its position is within the ROI 15, it may be imperative to validate the device's position by some additional means. A method for verifying a position of the untrusted device 22 is illustrated in the flowchart 100 of FIG. 2. At step 101, the system 10 identifies a requirement to validate the untrusted device and in particular to verify that the untrusted device 21 is truly located within the ROI 15. The validation requirement may be identified in response to receiving an agent participation request from the untrusted device 21.

At step 102, the untrusted device 21 is instructed to provide a list of wireless access points that are available to the device 21 and the system receives a list from the device at step 103. The list is then validated to determine if the device 21 is in fact within the ROI 15 (step 104).

The wireless access points are thus used to test the visibility of the device in a known geographic region. That is, if a trusted agent with a dedicated wifi access point can verify that an untrusted device is within view of the trusted agent's wifi access point, then the trusted agent can confirm the location of the untrusted device within the ROI. It is not necessary to pinpoint the location of the untrusted device 21 within the ROI since mere proximity to the wifi access points is sufficient to know that the untrusted device is within the ROI 15.

Such terms as "visible" and "in view" are used herein in regards to the wireless access points in the sense that a device is able to detect the presence of the wireless access point and/or to identify the wireless access point by a suitable reference, such as a Secure Set Identifier (SSID), whether or not the device is able to establish a complete communication and transfer of meaningful data with the wireless access point.

Once the location of the untrusted device has been validated as being within the ROI 15, other trusted agents are able to share agent resources with the device 21. For example, agent 12 may provide a serialized copy of the agent to the device 21 that may be received and activated by the agent bootstrap code executing on device 21.

Figure 3:
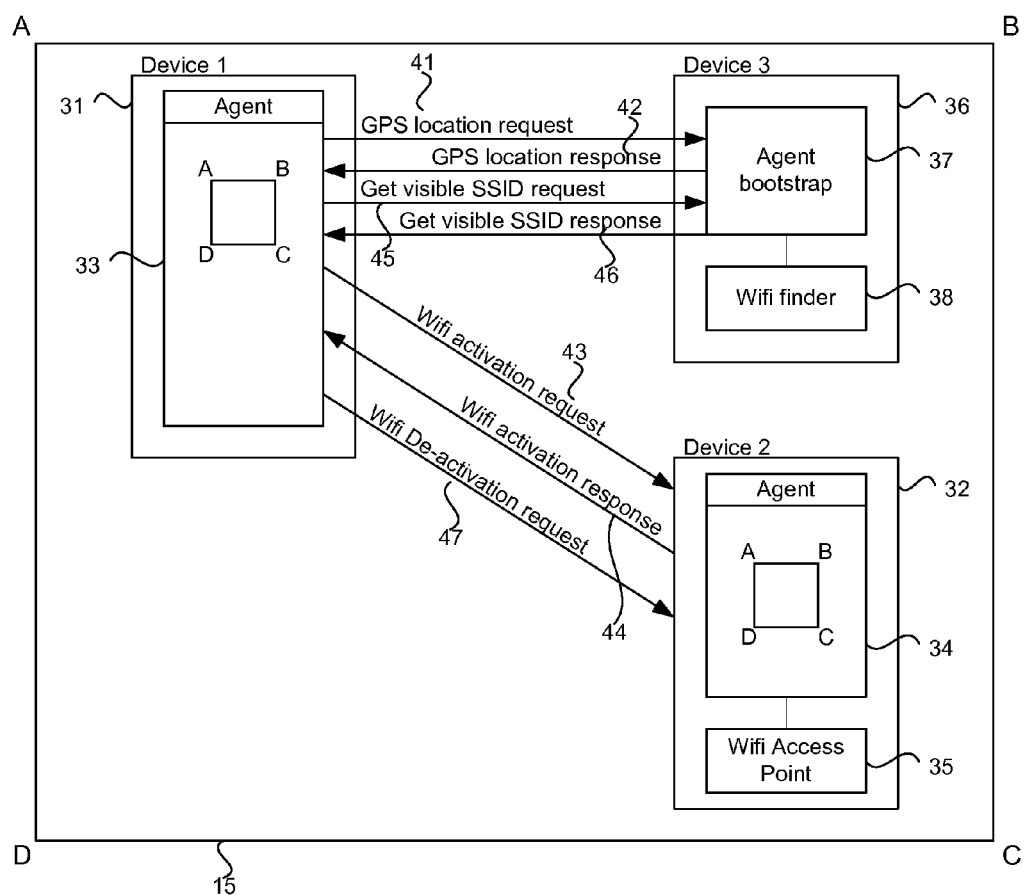
FIG. 3 illustrates a message flow during validation of an untrusted device.
Figure 4:
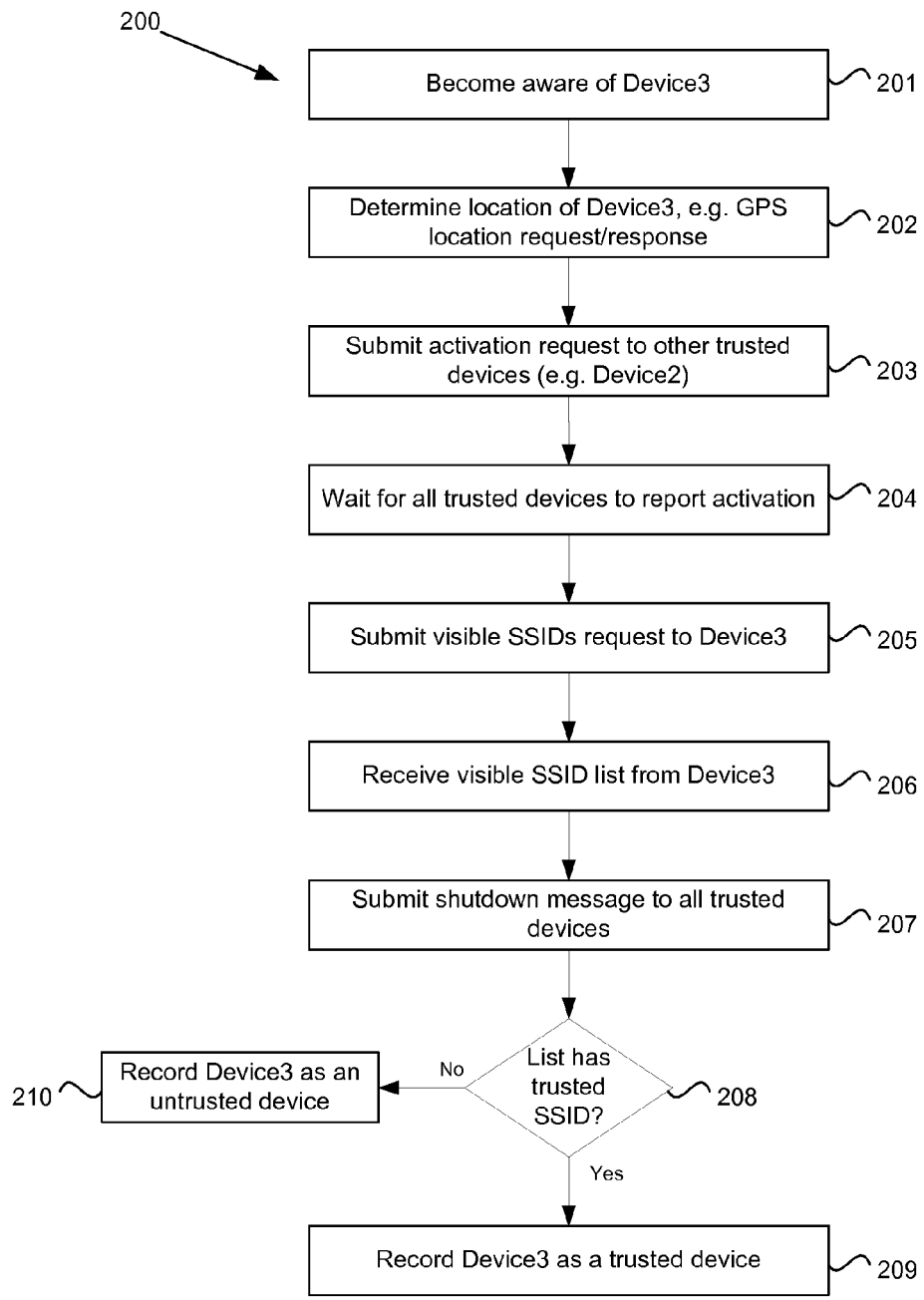
FIG. 4 illustrates a process for validating the location of an untrusted device including activation of wireless access points.

Further description of the validation process will be described with reference to FIGS. 3 and 4. FIG. 3 shows trusted devices Device1 31 and Device2 32 within a ROI 15. An agent 33 on Device1 31 may be configured to receive and process agent participation requests or may be otherwise configured to determine a requirement to validate a location of an untrusted device. Device2 32 also executes an agent 34 that controls a wireless access point 35. The untrusted Device3 36 executes agent bootstrap code 37 that allows Device3 36 to transmit agent participation requests. Device3 36 includes a wifi finder 38. The process for validating the location of device 35 is shown in the flowchart 200 of FIG. 4.

At step 201, agent 33 on Device1 31 may become aware of Device3 36 and so may transmit a GPS location request 41 to Device3 36 (step 202). In response, Device3 transmits a GPS location response 42 indicating the location of Device3 36 to agent 33. In one embodiment, the agent 33 may become aware of Device3 36 by receiving an agent participation request generated by the bootstrap code 37 on Device3 36 which may already indicate Device3's location. If Device3 indicates its location as being within the ROI, then agent 33 proceeds to validation of Device3's location, otherwise, Device3 may be ignored.

To commence validation, agent 33 submits a wifi activation request 43 to other trusted agents (step 203), such as agent 34 executing on Device2 32. On receipt of the wifi activation request 43, the agent 34 activates the wifi access point 35 which begins transmitting an SSID. Once activated, the agent 34 responds to agent 33 with a wifi activation response 44 indicating whether or not the wifi access point 35 was successfully activated. Agent 33 waits for all trusted devices with wifi access points to report activation (step 204) and then submits a Get Visible SSID Request 45 to Device3 (step 205). The bootstrap code 37 on Device3 36 processes the Get Visible SSID request 45 and uses the wifi finder 38 to identify available wifi access points. When the wifi finder 38 identifies a wifi access point, it adds the SSID of the wifi access point to a list. The completed list is then sent to and received by the agent 33 (step 206) in a Get Visible SSID Response 46. When the agent 33 receives the list from Device3 36, it firstly sends a Wifi De-activation Request 47 to the trusted devices (step 207) that causes deactivation of the wifi access points. The agent 33 then processes the visible SSID list from Device3 36 (step 208). The inclusion in the list of one or more SSIDs of a wifi access point associated with a trusted device is an indicator that Device3 36 is within range of the trusted device and is therefore accurately located within the ROI 15, thus validating the GPS location originally provided by Device3 36. Accordingly, Device3 36 may be recorded as a trusted device (step 209). If the list contains no relevant SSIDs, then the device can be recorded as untrusted (step 210). If Device3 36 is validated as a trusted device, then the agent 33 on Device1 31 may continue to process an agent participation request from Device3 36, for example by providing a serialized agent to Device3 36 for execution and activation by the agent bootstrap code 37.

Though not shown, Device1 31 may also include a wireless access point that may be visible to the wifi finder 38 of Device3 36.

The local agent in control of the wifi access point may generate the SSID for the access point at the time of activation. The SSID may be indicated to the agent that requested activation in the wifi activation response 44. The continual regeneration of the SSID, e.g. by random generation, prevents the above described process of location confirmation from being circumvented by malicious devices.

In one embodiment, there may be provided a correlation table which maps locations within the ROI 15 with wifi devices that should be visible to an untrusted device. That is, it may not be sufficient for the Visible SSID list provided by an untrusted device to indicate only a single SSID if the correlation table indicates that multiple SSIDs should be visible for a given location of the untrusted device.

The above described system seeks to provide added confidence about a device's reported GPS location by seeking to corroborate the GPS location with visibility constraints of dynamically-created Wifi access point beacons within the ROI. The above described embodiments are advantageous for confirming a device location because a large number of wifi access points in fixed locations are not required since the calculation of an exact location is not required. The wifi access points may be initialized and managed exclusively by the participating agents in the ROI and so the system does not rely on pre-existing wifi access points in the ROI. The untrusted device does not need to connect with any of the Wifi access points in the ROI, simple visibility of the SSID (beacon) is all that is needed. While the trusted agents within the ROI will typically be mobile agents, in one embodiment, fixed agents may also be utilized.

Since the trusted agents within the ROI may vary over time, in one embodiment, the system maintains a list of trusted agents within the ROI. When a requirement to validate an untrusted device occurs, the validating agent, e.g. Device1 31 in the above examples, may locate those trusted agents within the ROI and provides them with commands to activate their respective wireless access points.

In one embodiment, the validating agent broadcasts the wifi activation requests so that any trusted agent within communication range may receive the wifi activation instruction. When a trusted agent receives the request, the trusted agent will check that its location is still within the ROI before activating its respective wireless access point. Thus, any trusted agents that may be within communication range of the consolidation agent but are outside of the ROI, will ignore the request to activate their wireless access point.

Since not every trusted agent in the ROI is required to be equipped with a wireless access point facility, those trusted agents that do not have corresponding wireless access points will ignore any wireless access point activation requests that they receive.

Figure 5:
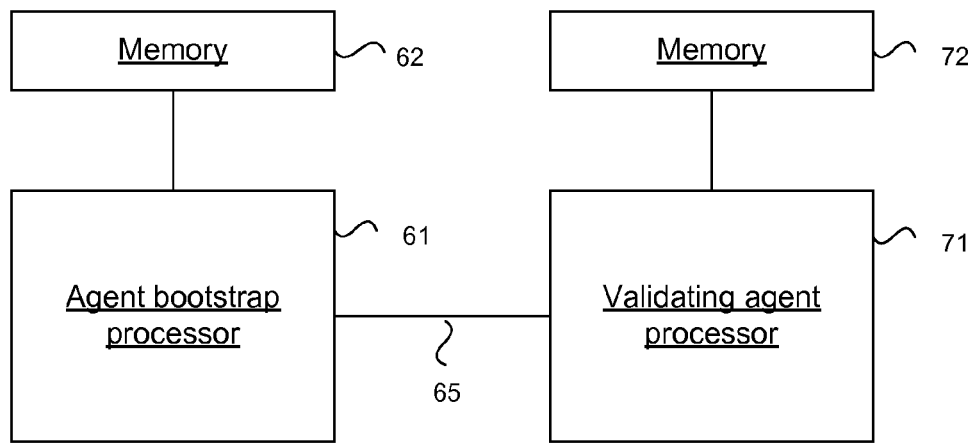
FIG. 5 illustrates a processor and memory of an agent bootstrap processor and a validating agent processor.
Figure 6:
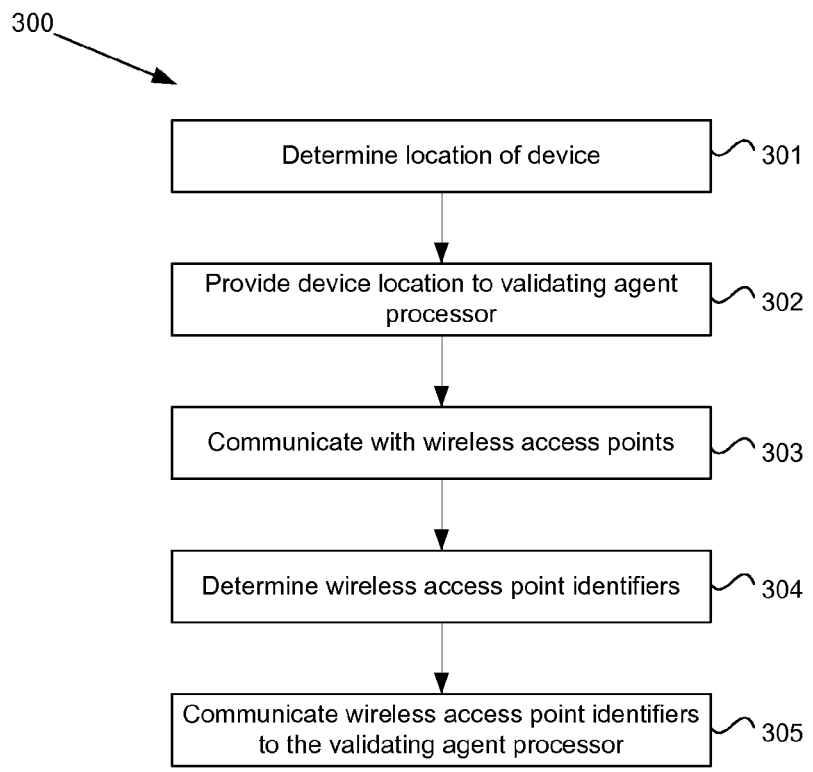
FIG. 6 illustrates an instruction set that can execute on the agent bootstrap processor of FIG. 5.

The components of the system 10 may be embodied in hardware, software, firmware or a combination of hardware, software and/or firmware. In a hardware embodiment, a mobile device such as Device3 36 may include a processor 61 operatively associated with a memory 62 as shown in FIG. 5. The memory 62 may store an instruction set 300 executable by the processor 61 which may include the bootstrap code as shown in FIG. 6. The bootstrap code allows the processor 61 to determine a location of the first device (step 301), for example by interfacing with a location provider of the mobile device. The processor 61 may then communicate the location of the first device to a processor 71 of a validating agent (step 302), such as Device1 31 in the examples described above. The processor 61 will typically communicate with the processor 71 through a suitable wireless communications link 65. The agent bootstrap processor 61 is then able to communicate with any available wireless access points (step 303) to determine an identifier of each of the wireless access points (step 304) which can be communicated to the validating agent processor 71 for subsequent validation by the validating agent.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method, comprising:
identifying a validation requirement for an untrusted device in a region of interest in response to a participation request;
causing activation of at least one wireless access point in response to identifying the validation requirement;
requesting the untrusted device identify the at least one wireless access point in the region of interest;
receiving, from the untrusted device, a list identifying the at least one wireless access point in the region of interest with a corresponding at least one identifier;
validating the at least one wireless access point in response to the at least one identifier; and
deactivating the at least one wireless access point in response to receiving the at least one identifier from the untrusted device.

2. The method according to claim 1, wherein validating the at least one wireless access point comprises establishing the untrusted device as a trusted device based at least in part on the at least one identifier.

3. The method according to claim 2, further comprising sharing at least one agent resource with the untrusted device after establishing the untrusted device as a trusted device.

4. The method according to claim 1, wherein the participation request is configured to request approval for the untrusted device to participate with the trusted device in the region of interest.

5. The method according to claim 4, further comprising determining that the participation request is configured to indicate that the untrusted device is located within the region of interest.

6. The method according to claim 1, further comprising accessing the at least one wireless access point from a mobile device.

7. A method, comprising:
identifying a validation requirement for an untrusted device in a region of interest;
locating a trusted agent within the region of interest in response to identifying the validation requirement;
causing activation of a wireless access point associated with the trusted agent in the region of interest;
requesting the untrusted device identify the at least one wireless access point in the region of interest;
receiving, from the untrusted device, a list identifying the at least one wireless access point in the region of interest with a corresponding at least one identifier; and
validating the at least one wireless access point in response to the at least one identifier.

8. A trusted device, comprising:
a memory device configured to store instructions defining an agent application;
a processing device configured to execute the instructions stored in the memory device to:
identify a validation requirement in response to receiving a request to participate with the trusted device in a region of interest from an untrusted device;
identify a location of the untrusted device in response to receiving the request to participate from the untrusted device;
send an activation command to at least one trusted device within the region of interest causing activation of a corresponding at least one wireless access point in response to the location of the untrusted device being substantially within the region of interest;

request the untrusted device identify the at least one wireless access point;

receive, from the untrusted device, at least one wireless access point identifier configured to identify the at least one wireless access point in response to the request to identify;

determine the at least one wireless access point identifier as corresponding to the at least one wireless access point in the region of interest; and validate the untrusted device in response to the at least one wireless access point identifier corresponding to the at least one wireless access point in the region of interest.

9. The trusted device according to claim 8, wherein the processing device is further configured to command the untrusted device to identify all wireless access points visible to the untrusted device.

10. A non-transitory computer-readable storage device comprising computer-executable instructions stored thereon that configure a processing device to perform operations comprising:

identifying a validation requirement for an untrusted device in response to receiving a participation request from the untrusted device;

instructing the untrusted device to identify at least one wireless access point visible to the untrusted device;

receiving, from the untrusted device, a list identifying the at least one wireless access point with a corresponding at least one identifier;

validating the untrusted device in response to the at least one identifier corresponding to a wireless access point in a region of interest; and deactivating the at least one wireless access point in response to receiving the at least one identifier from the untrusted device.

11. The non-transitory computer-readable storage device of claim 10, wherein the processing device is configured to perform operations further comprising establishing the untrusted device as a trusted device in response to the at least one identifier corresponding to the wireless access point in the region of interest.

12. The non-transitory computer-readable storage device of claim 11, wherein the processing device is configured to perform operations further comprising sharing at least one agent resource with the untrusted device after establishing the untrusted device as a trusted device.

13. The non-transitory computer-readable storage device of claim 10, wherein the processing device is configured to perform operations further comprising activating the at least one wireless access point in response to identifying the validation requirement.

14. The non-transitory computer-readable storage device of claim 10, wherein the participation request is configured to request approval for the untrusted device to participate in the region of interest.

15. The non-transitory computer-readable storage device of claim 10, wherein the processing device is configured to perform operations further comprising determining that the participation request is configured to indicate that the untrusted device is located within the region of interest.

16. The non-transitory computer-readable storage device of claim 10, wherein the processing device is configured to perform operations further comprising accessing the at least one wireless access point from a mobile device.

17. A non-transitory computer-readable storage device comprising computer-executable instructions stored thereon that configure a processing device to perform operations comprising:

identifying a validation requirement for an untrusted device in response to receiving a participation request from the untrusted device;

locating each trusted agent within a region of interest in response to identifying the validation requirement;

activating any wireless access point associated with any trusted agent in the region of interest;

instructing the untrusted device to identify at least one wireless access point visible to the untrusted device;

receiving, from the untrusted device, a list identifying the at least one wireless access point with a corresponding at least one identifier; and validating the untrusted device in response to the at least one identifier corresponding to a wireless access point in the region of interest.

18. A method, comprising:

transmitting a participation request from an untrusted device to a trusted device operating in a first region, wherein the participation request causes deactivation of a plurality of trusted wireless access points corresponding to the trusted device or at least one other trusted device located in the first region;

identifying a wireless access point located in a second region within communicable range of the untrusted device;

transmitting an identifier corresponding to the wireless access point located in the second region within communicable range of the untrusted device from the untrusted device to the trusted device; and receiving validation from the trusted device in response to the identifier corresponding to at least one of the plurality of trusted wireless access points corresponding to the trusted device or at least one other trusted device operating in the first region;

wherein the trusted device is configured to deactivate the at least one of the plurality of trusted wireless access points in response to receiving the identifier.

19. The method of claim 18, further comprising activating the wireless access point located in the second region within communicable range of the untrusted device.

20. The method of claim 18, further comprising randomly generating the identifier each time the wireless access point located in the second region is activated.

21. The method of claim 18, further comprising transmitting a location of the untrusted device to the trusted device.

22. An untrusted device, comprising:

a memory device configured to store instructions defining an agent application;

a processing device configured to execute the instructions stored in the memory device to:

transmit a participation request from an untrusted device to a trusted device operating in a first region;

identify a wireless access point located in a second region within communicable range of the untrusted device in response to the participation request;

transmit an identifier corresponding to the wireless access point from the untrusted device to the trusted device; and receive validation from the trusted device in response to the identifier corresponding to at least one of a plurality of wireless access points corresponding to the trusted device or at least another trusted device operating in the first region;

wherein the trusted device causes activation of the plurality of access points in response to receiving the participation request; and wherein the trusted device is configured to cause deactivation of the plurality of wireless access points in response to receiving the identifier.

23. The untrusted device of claim 22, wherein the processing device is further configured to activate the wireless access point located in the second region using the untrusted device.

24. The untrusted device of claim 22, wherein the processing device is further configured to randomly generate the identifier each time the wireless access point located in the second region is activated.

25. The untrusted device of claim 22, wherein the processing device is further configured to transmit a location of the untrusted device to the trusted device.

26. A non-transitory computer-readable storage device comprising computer-executable instructions stored thereon that configure a processing device to perform operations comprising:
   transmitting a participation request from an untrusted device to a trusted device operating in a first region;
   identifying a wireless access point located within communicable range of the untrusted device in response to transmitting the participation request;
   transmitting an identifier corresponding to the wireless access point from the untrusted device to the trusted device; and
   receiving validation from the trusted device in response to the identifier corresponding to at least one of a plurality of wireless access points operating in the first region;
   wherein the trusted device causes activation of at least one of the plurality of wireless access points in response to receiving the participation request; and
   wherein the trusted device is configured to cause deactivation of the at least one of the plurality of wireless access points in response to receiving the identifier.

27. The non-transitory computer-readable storage device of claim 26, wherein the processing device is configured to perform operations further comprising activating the wireless access point within communicable range of the untrusted device using the untrusted device.

28. The non-transitory computer-readable storage device of claim 26, wherein the processing device is configured to perform operations further comprising executing a bootstrap application using the untrusted device received from the trusted device after the validation.

29. The non-transitory computer-readable storage device of claim 26, wherein the processing device is configured to perform operations further comprising randomly generating the identifier each time the wireless access point within communicable of the untrusted device is activated.

30. The non-transitory computer-readable storage device of claim 26, wherein the processing device is configured to perform operations further comprising transmitting a location of the untrusted device to the trusted device.

* * * * *